Dec. 30, 1952 — A. J. PATCH — 2,623,360
OSCILLATING IMPELLING TRANSMISSION MEANS
FOR WASHING MACHINES AND THE LIKE
Filed Jan. 7, 1949 — 7 Sheets-Sheet 1

Inventor
ALLEN J. PATCH
By Lloyd W. Patch
ATTORNEY

Dec. 30, 1952   A. J. PATCH   2,623,360
OSCILLATING IMPELLING TRANSMISSION MEANS
FOR WASHING MACHINES AND THE LIKE
Filed Jan. 7, 1949   7 Sheets-Sheet 2

Inventor
ALLEN J. PATCH
By Lloyd W. Patch
ATTORNEY

Dec. 30, 1952    A. J. PATCH    2,623,360
OSCILLATING IMPELLING TRANSMISSION MEANS
FOR WASHING MACHINES AND THE LIKE
Filed Jan. 7, 1949    7 Sheets-Sheet 3

Inventor
ALLEN J. PATCH
By Lloyd W. Patch
ATTORNEY

Dec. 30, 1952 — A. J. PATCH — 2,623,360
OSCILLATING IMPELLING TRANSMISSION MEANS
FOR WASHING MACHINES AND THE LIKE
Filed Jan. 7, 1949 — 7 Sheets-Sheet 4

Inventor
ALLEN J. PATCH
By Lloyd W. Patch
ATTORNEY

Dec. 30, 1952          A. J. PATCH          2,623,360
OSCILLATING IMPELLING TRANSMISSION MEANS
FOR WASHING MACHINES AND THE LIKE Filed Jan. 7, 1949                                        7 Sheets-Sheet 5

Inventor
ALLEN J. PATCH
By Lloyd W. Patch
ATTORNEY

Dec. 30, 1952

A. J. PATCH

2,623,360

OSCILLATING IMPELLING TRANSMISSION MEANS FOR WASHING MACHINES AND THE LIKE

Filed Jan. 7, 1949

Inventor

ALLEN J. PATCH

By Lloyd W. Patch

ATTORNEY

Patented Dec. 30, 1952

2,623,360

UNITED STATES PATENT OFFICE 2,623,360

OSCILLATING IMPELLING TRANSMISSION MEANS FOR WASHING MACHINES AND THE LIKE

Allen J. Patch, Duluth, Minn.; Ruth M. Patch executrix of said Allen J. Patch, deceased Application January 7, 1949, Serial No. 69,778

6 Claims. (Cl. 60—54.5)

This invention relates to improvements in oscillating impelling transmission means for washing means and the like, and particularly to means of this character including a fluid transmission and adapted to convert continuous driving power motion into oscillatory driven motion.

An object of my invention is to provide mechanism of this character to accomplish oscillatory motion, including a fluid transmission between driving and driven parts, whereby smooth operation is accomplished with a minimum of vibration and noise.

Another object is to provide such a mechanism by which motion is transmitted from a rotating member and is converted into oscillatory movement at a driving member, to thus oscillate an agitator or other working part of a washing machine or other mechanism, together with a fluid transmission.

Yet another object is to provide a variable control in the fluid transmission so that the operation of the fluid transmission can be varied.

A further purpose is to so construct the fluid transmission that the degree and intensity of oscillation can be adjusted and varied from an idle position to maximum action and oscillation.

Still another object is to provide a fluid transmission with oscillatable driving and driven parts which is so constructed that the degree of oscillation of the driven part can be varied with respect to and can be considerably increased over the degree of oscillation of the driving part.

Another purpose is to provide settable variable control means so that the operation of the driving part can be maintained substantially constant and the movement of the driven part can be varied from a stopped position to maximum activity and oscillation and to any desired intermediate position and activity.

Yet another purpose is to provide a transmission for clothes washing machines having an impulsing agitator oscillatable on a vertical axis, with the oscillation accomplished by bottom drive means including a fluid transmission.

A further object is to provide an operator actuated control means for such a mechanism by which the operation can be carried out from minimum or stopped relation to maximum oscillation.

Another object is to provide an oscillating fluid transmission with which a swinging movement of 90 degrees of the driving or impeller oscillator can be multiplied and increased to as great as 220 degrees of swinging movement at the driven oscillator.

Still another purpose is to provide a manually actuatable fluid control valve which can be opened and closed and can be adjusted to any intermediate setting for starting and stopping and full operation and for variable stroke of the agitator or driven part, as may be desired.

A further object is to so construct the mechanism that as the parts are operated with a substantially non-compressible liquid transmission there will be no pumping or undue accumulation or loss of liquid, and the action and operation will thus be kept in balance at all times and under all conditions.

With the above and other objects in view, some of which will be apparent to those skilled in the art and others of which are inherent in the construction and operation and use of the transmission, my invention includes certain novel features of construction and combination and arrangement of parts which will be hereinafter set forth in connection with the drawings and then pointed out in the claims.

In the drawings:

Figure 6 is a transverse sectional view through the transmission casing substantially on line 6—6 of Figure 3.

With power operated washing machines having an agitator operating with an oscillatory movement, and in other machines of this character, the rotary movement of a motor or other particular unit is customarily transmitted and translated into oscillatory movement by means of gears and racks or by linkage arrangements. With such construction for imparting an oscillatory movement to the agitator, it has been found that the gears and racks and linkage mechanism cause considerable noise, and that the reversing of the movement of the agitator within the water in the tub will cause the entire machine to vibrate and will result in considerable shock on the mechanism.

Where racks and gears and linkage means have been employed, it has been found that limitations are imposed upon the effective oscillatory swing or movement that can be accomplished; and, it is known that at the end swing in the oscillatory movement a considerable load is imposed upon mechanical parts by the load of the water and clothes or other material within the tub. Further, it has been found in some instances and circumstances of use substantially positive drive of the oscillating agitator through a wide angle of movement approximating 220 degrees is desirable; and, in other uses it is advantageous to swing or oscillate the agitator through a shorter path of travel, and consequently through a lesser number of degrees or part of a complete circle.

It is the purpose of the present invention to provide means actuated by rotation of a motor shaft to accomplish oscillatory movement of a driving impeller, and to then transmit oscillatory movement to a driven shaft through a fluid transmission using a substantially non-compressible liquid. To this end, a driven oscillator is provided in connection with the agitator or agitator shaft, and provision is made for varying the ratio or proportion of movement of the driven oscillator, and through proportioning of the impeller oscillator with respect to the driven oscillator. Further, I provide adjustable and settable fluid control valve means to be opened and closed and adjusted for starting and stopping and full operation and variable stroke or operation of the driven oscillator.

In this way, the driven oscillator can be given a much wider angle or degree of oscillatory motion than is imparted to the impeller or driving oscillator; and, the parts can be coupled or adjusted to give a full action vigorous drive on a long oscillating angle to the driven oscillator, and consequently to the agitator shaft or part; and, by adjustment of the valve and entire opening of said valve the substantially non-compressible liquid can be permitted limited or complete flow in a circuit reducing or stopping the oscillation of the driven oscillator.

In the present instance I have illustrated my improved oscillator impelling transmission in an embodiment with a washing machine, and connected to give an oscillating drive to an impelling agitator.

As illustrated, the tub 1 can be of any desired construction, and this tub is preferably supported by legs 2 and 3, or is set up or mounted in any other desired way. In the present instance I show a casing portion 4 around the tub 1, and a support cross-member 5 connected across beneath the tub 1 and carried by the support legs.

Figure 4:
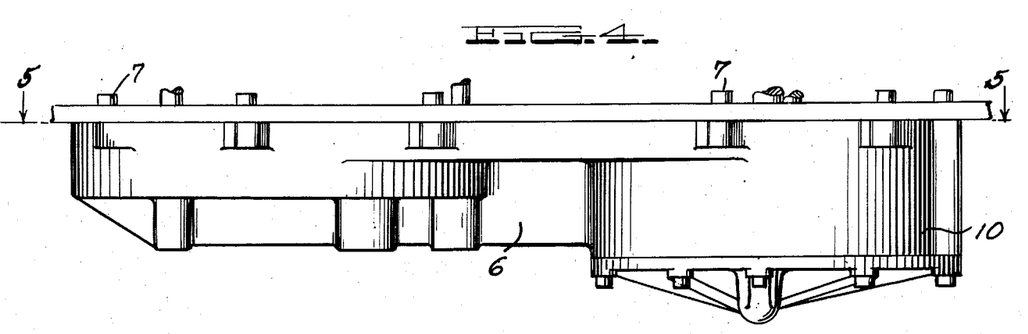
Figure 4 is an enlarged side elevation showing the gear transmission casing.
Figure 5:
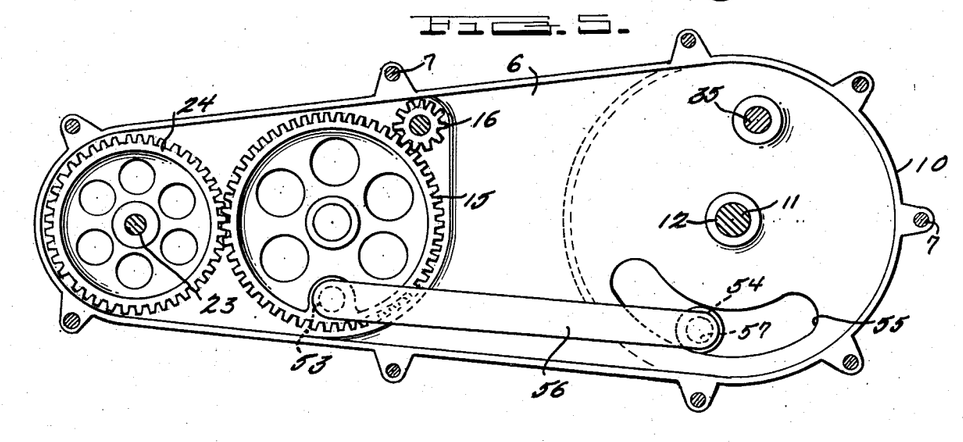
Figure 5 is a top plan view taken substantially on line 5—5 of Figure 4.
Figure 7:
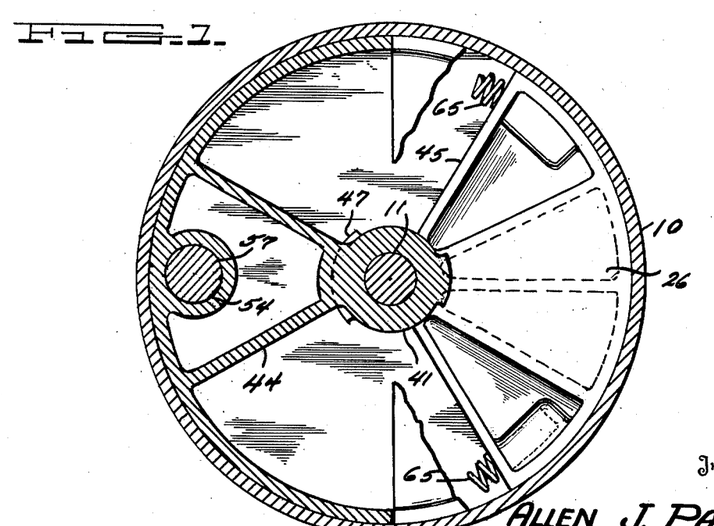
Figure 7 is a transverse sectional view taken lower down than the showing of Figure 6.
Figure 8:
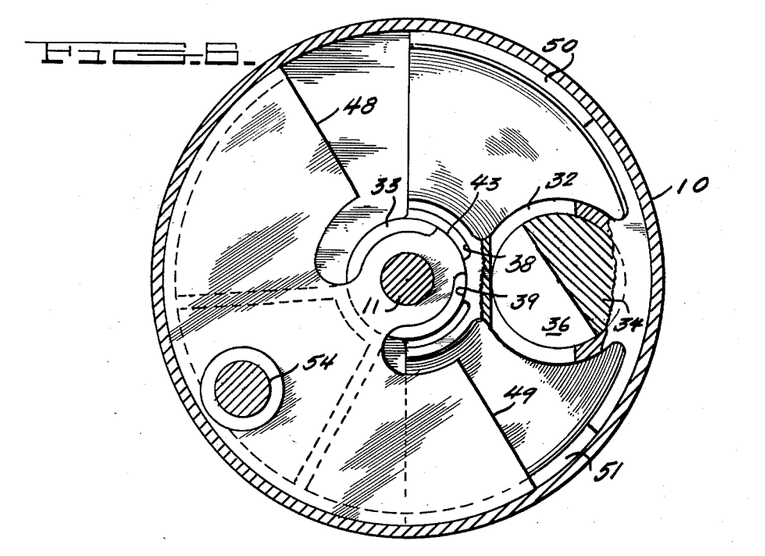
Figures 8, 9, 10, and 11, are views similar to Figure 7, showing the parts in other operative positions.
Figures 9, 10:
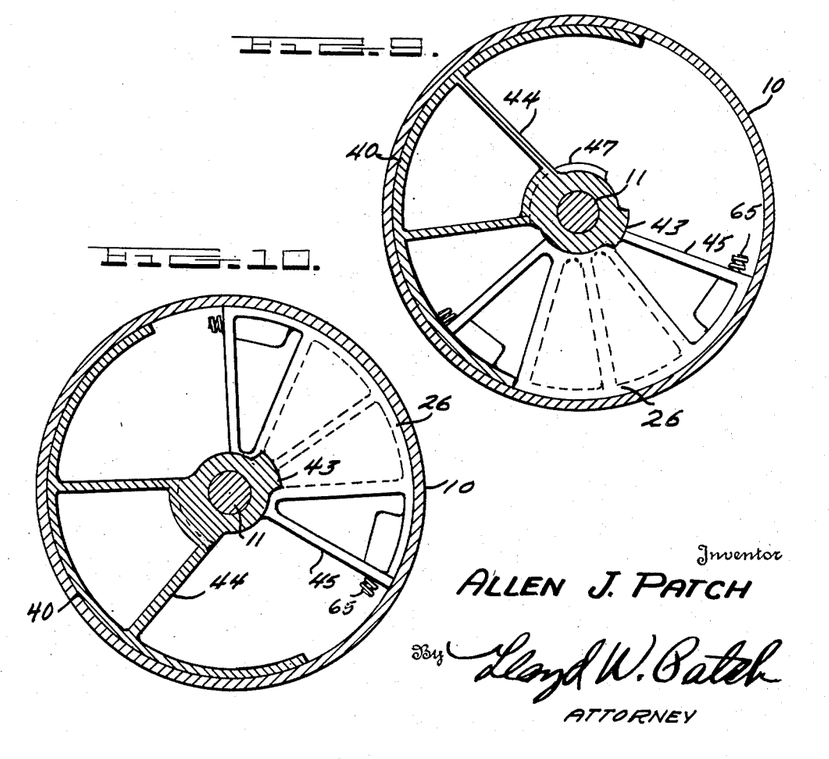
Figure 11:
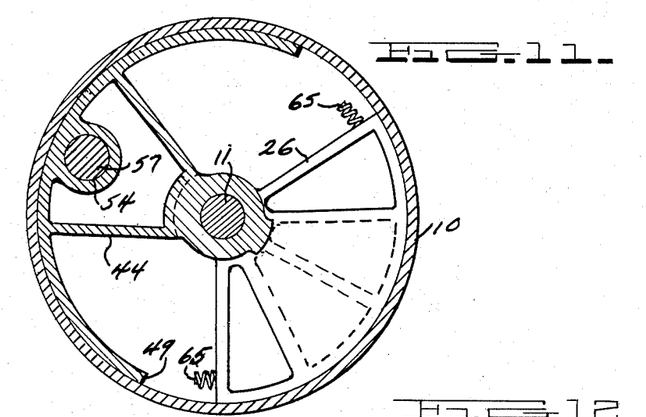
Figure 12:
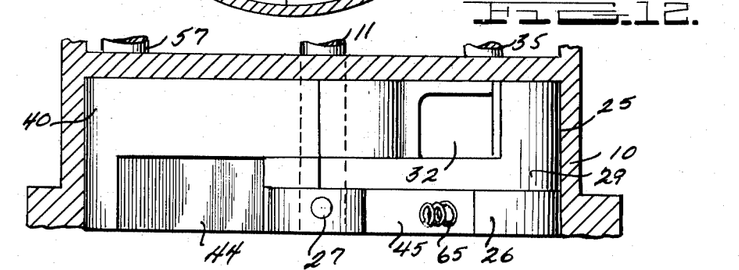
Figure 12 is a vertical sectional view through parts of the transmission.
Figure 13:
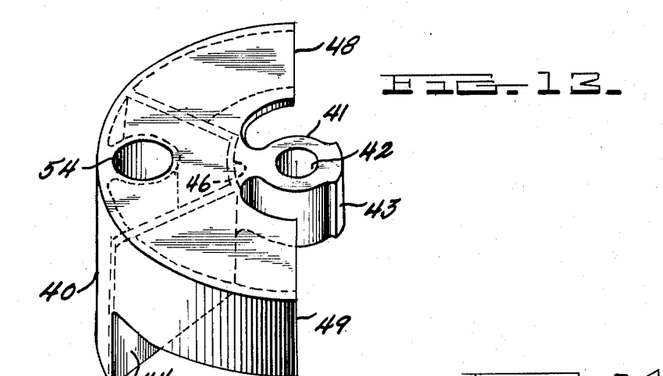
Figure 13 is a perspective view showing the driving impeller of the transmission.

A gear and drive casing 6, the construction of which is perhaps best shown in Figures 4 and 5, is mounted on the lower side of the cross-member 5, and is held in proper mounting and suspension by bolts or other fastenings 7.

The tub 1 has a central bearing sleeve 8 upstanding in the middle thereof, and an agitator 9 is mounted on this bearing sleeve 8 for revolvable or oscillatory movement.

At one end of the casing 6 a substantially circular and cylindrical transmission casing 10 is provided to be substantially axially aligned with the bearing sleeve 8. An agitator oscillating driven shaft 11 is revolvably or oscillatably mounted in suitable bars 12 and 13 of the transmission housing portion 10, and this shaft 11 extends upwardly through the bearing sleeve 8 and has connection at its upper end 14 with the agitator 9.

Figure 1:
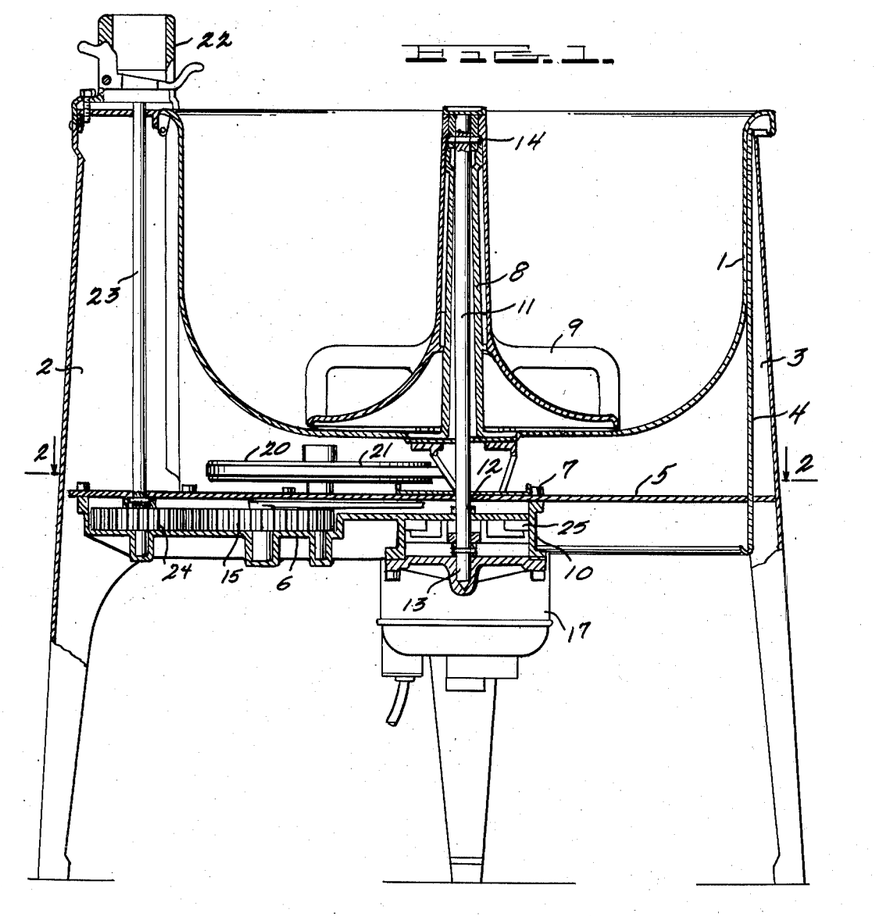
Figure 1 is a vertical sectional view through a clothes washing machine having an embodiment of my invention incorporated therewith.
Figure 2:
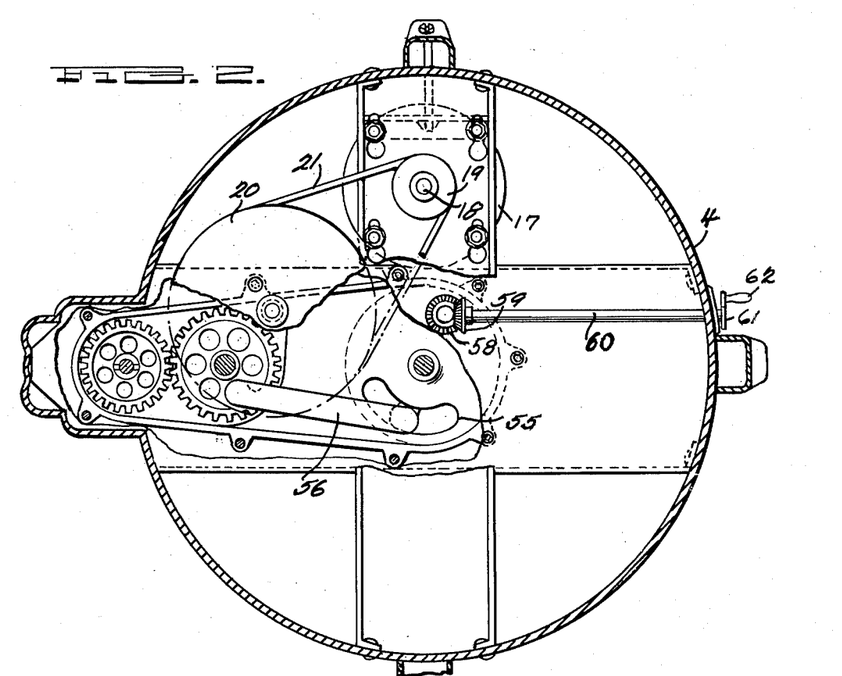
Figure 2 is a horizontal sectional view substantially on line 2—2 of Figure 1.

As perhaps best illustrated in Figures 2 and 5, a driving gear 15 is mounted in the middle portion of the gear casing 6, and has a driving pinion 16 revolvably mounted in the casing in mesh therewith. An electric motor 17, or other suitable power means, can be mounted upon or supported by the leg structure of the washing machine, or other suitable structural portions, and the motor shaft 18 has a V-belt drive sheave 19 thereon. A driven belt pulley 20 is mounted on the shaft carrying drive pinion 16, and a belt 21 extends over the drive sheave 19 and the driven pulley 20 so that when the motor is in operation the belt pulley 20 and consequently the driving pinion 16 will be driven at reduced speed.

Where a wringer is to be used in conjunction with the washing machine, a suitable wringer mounting bracket 22 (Fig. 1) can be provided on the supporting structure, and a drive to operate said wringer can be accomplished from the driving gear 15 (Fig. 5). In the present instance I have shown a wringer operating shaft 23 revolvably mounted in suitable bearings and having a portion extending into the gear casing 6. A wringer operating gear 24 is mounted on the shaft 23 in mesh with gear 15, and in this way the wringer operating shaft 23 is rotated. Any suitable type of wringer can be employed, and geared or other control parts can be interposed between shaft 23 and the operating parts of the wringer. Since wringer drive connections are old and well known, in many adaptations, no attempt is here made to illustrate or describe particular embodiments.

With the parts arranged in this manner, when the motor is running, the driving gear 15 is constantly rotated at a speed relatively slower than the speed of the motor. Wringer operating gear 24 and the wringer operating shaft 23 are also constantly rotated, and the wringer can be controlled in both forward and reverse operation and can be stopped by means which is well known in the art.

Figure 15:
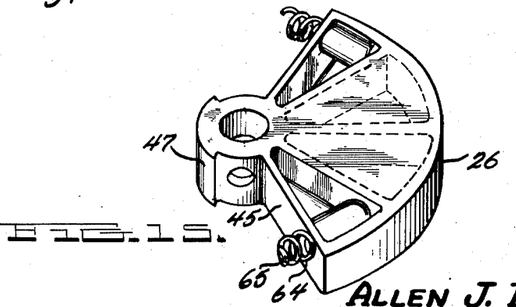
Figure 15 is a perspective view better illustrating the driven impeller member.

The fluid or liquid transmission casing 10 is provided with a single substantially circular and cylindrical chamber 25, and the agitator shaft 11 is substantially centered within this chamber. A substantially sectorial driven oscillator piston 26 is disposed in the lower part of the circular chamber 25 and is rigidly connected with the shaft 11 by means of a pin 27, or other suitable fastening. This piston can be made of any suitable construction, and in the present instance is shown as a casting having cored out portions to lighten the structure, as perhaps best disclosed in Figure 15. This sectorial driven oscillator piston 26 is of a width constituting less than one-half of a circle, and can in fact be of any width that may be desired for particular adaptations and uses.

Figures 14, 16:
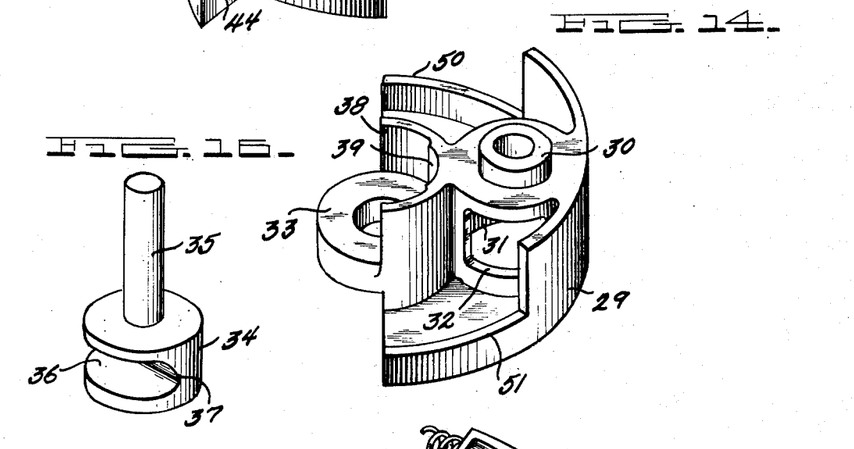
Figure 14 is a perspective view to better disclose the valve housing of the transmission.
Figure 16 is a perspective view of the valve.

Also, while the oscillator piston 26 is here shown as being relatively thin along its axial dimension, the size can be varied to suit different conditions of use and operation. The transmission case portion 10 has an opening 28 through the upper wall thereof on one side of the shaft 11, and a liquid passage and valve member 29, perhaps best illustrated in Figure 14, is adapted to be fitted within the circular chamber 25 above the segmental driven oscillator piston 26, with an extension 30 thereof received in the opening 28 so that the member 29 is held against rotation. This member 29 has a bearing opening through the extension 30 with a valve chamber at 31 aligned therewith, and liquid flow passages 32 are provided on opposite sides of the valve chamber 31. The member 29 has a bearing extension 33 thereon to receive the shaft 11, and the member 29 is thus held in substantially fixed relation within the circular chamber 25. A valve member 34 is mounted rotatably in this valve chamber 31 and has an operating shaft 35 extending through the bearing opening in the extension 30 so that this shaft is available for turning the valve member. The valve member 34 has a passageway 36 transversely therethrough, with the passageway at one side tapered or pointed as at 37, and consequently when the valve is closed the passage of liquid can be controlled and can be gradually and delicately regulated due to this tapered or pointed formation giving a gradual opening through the liquid flow passages 32.

The member 29 has a recess 38 above the bearing extension 33, and has a bearing face 39 at the inner side of this recess. An impeller oscillator piston 40, also substantially sector-shaped is provided with a central bearing portion 41, having therein a bearing opening 42 to loosely receive the shaft 11, and this bearing 41 is adapted to be swingably received into the recess 38. Bearing portion 41 has a bearing extension 43 thereon adapted to have a tight sliding fit against the bearing face 39. The impeller or driving oscillating piston 40 has the middle portion thereof of sectorial shape to provide piston faces at 44, such piston faces 44 being relatively considerably larger than the piston faces 45 of the sectorial driven oscillator piston 26. The main portion of the impeller or driving oscillatory piston 40 is of sufficient height to substantially fit between the top and bottom walls of the circular chamber 25, and the outer curved wall of the sectorial portion has a sliding fit with the outer wall of the circular chamber. The impeller oscillating piston 40 has a skirt portion 46 provided with a bearing surface to have a substantially liquid tight bearing with the bearing extension 47 on the sectorial driven oscillator piston 26. The impeller oscillating piston 40 has extensions 48 and 49 thereon at each side beyond the piston faces 44, and these extensions are cut away at their lower edges to clear the side extensions 50 and 51 on the liquid passage and valve member 29. As shown, the transmission casing 10 has a removable head or plate 52 so that access may be had to the circular chamber, and the several parts contained and operating in this fluid or liquid chamber 25 can thus be readily assembled and disassembled.

The driving gear 15 has a bearing opening 53 provided outwardly from its axis of rotation, and the impeller oscillator piston 40 has the bearing opening 54 located and spaced outwardly from the bearing opening 42. The top of the transmission casing 10 has an arcuate slot 55 therethrough substantially in alignment with the bearing opening 54, and a pitman rod 56 has bearing extensions 57 thereon received in the bearing openings 53 and 54.

Referring to the illustrations in Figures 2 and 5, it will be seen that the arcuate opening 55 is disposed in such position that the pitman rod 56 can work freely, with the bearing extension 57 traveling forward and back within the arcuate slot or opening 55. Since it is desirable that the sectorial driving or impeller oscillating piston be disposed substantially opposite to the sectorial driven oscillator piston 26, it is perhaps preferable that the liquid passage and valve chamber portion 29 be located substantially diametrically opposite to the arcuate slot 55, and this will permit substantially liquid tight sliding bearings between the several faces of the two oscillatory piston members and the adjacent parts of the transmission casing 10 and the liquid passage and valve member 29.

Figure 3:
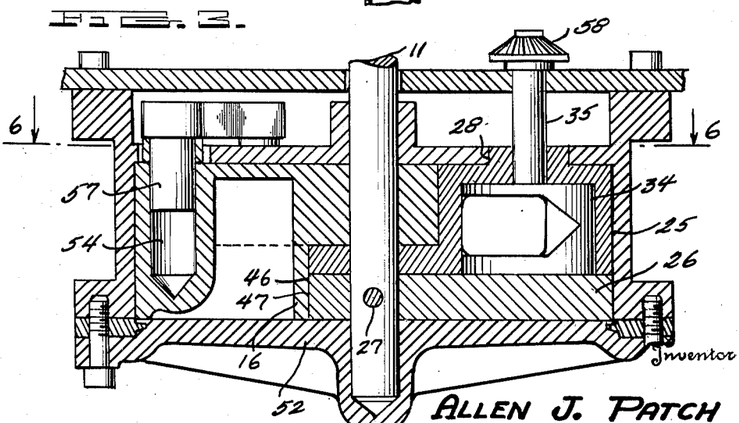
Figure 3 is an enlarged vertical sectional view through the transmission means.

As the driving gear 15 rotates, the pitman rod 56 will cause driving impelling oscillating piston 40 to be rocked back and forth in predetermined oscillatory movement and path, and since the transmission casing 10 is filled with a substantially non-compressible liquid the piston faces 44 will be alternately presented to exert force to move the liquid. When valve member 34 is in the position shown in Figure 3, or is even partly open, the substantially non-compressible fluid or liquid will flow through the passages 32 and the quantity of flow can be governed and regulated and can be stopped by manipulation of the valve 34. When the valve 34 is completely open, the liquid will flow freely through passages 32, and there will be an alternate circulation of liquid without any obstruction to flow of all the liquid. However, when valve 34 is partially or completely closed, the movement of the liquid through piston faces 44 will cause the more or less confined liquid to exert considerable moving pressure against the piston faces 45 of the driven oscillatory piston 26. When valve 34 is completely closed, the full volume of the non-compressible liquid as moved by the piston area or face 44 will impart force to the piston face 45 or relatively smaller area, and consequently a swinging or oscillatory movement of the driving impeller oscillatory piston 40 through an angle of 90 degrees can thus be increased to impart oscillatory movement to the driven oscillatory piston through an arc or swing of substantially 220 degrees. Through the confinement of the liquid, this driving and oscillatory motion as imparted to the shaft 11 will cause the agitator 9 to be positively and vigorously agitated within the tub throughout substantially 220 degrees. The gear and transmission casing 6 is so made that the entire casing can be filled with oil or other substantially non-compressible liquid to a height or depth sufficient to provide a lubricating bath for the gears and pitman and other moving parts, and at the same time the level of the liquid will be kept sufficiently high that a full supply of liquid to and within the circular chamber 25 and to the fluid transmission is maintained at all times.

With the parts thus substantially operating and bathed in lubricant, a very quiet mechanism is provided, and there will be little or no noise accompanying the operation. Further, since the transmission is through the fluid drive the oscillatory movement of the shaft 11 will be initiated and reversed and will be continued without noise such as might result from the usual gearing and linkage arrangements heretofore employed.

As the valve 34 is turned to open the passageway therethrough, this opening will be gradual due to the formation of the passage 36 with the pointed area at 37, and the valve can thus be adjusted to give limited or full flow of liquid. When the valve is partly opened, the flow of liquid therethrough will relieve some of the pressure from piston faces 44 and the pressure exerted against piston faces 45 will be less, so that the degree of swing or oscillation of the segmental driven oscillator piston 26, and consequently the oscillation of the shaft 11 and the agitator 9 will be shortened.

When valve 34 is completely opened the entire volume of liquid can flow through this valve without exerted operating pressure on piston faces 45, and the mechanism will then be stopped.

Figure 17:
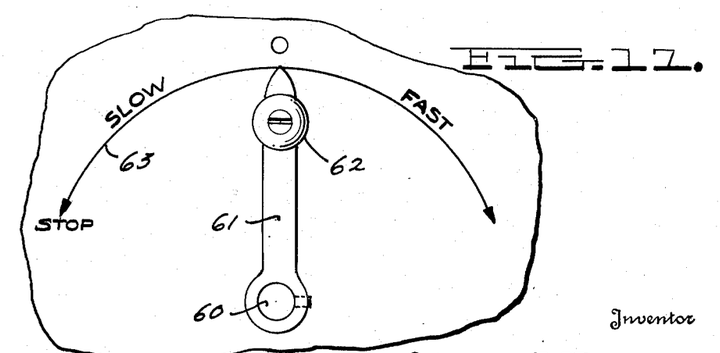
Figure 17 is a fragmentary elevational view to better show valve operating means.

Various operating means may be provided for valve 34, and in the present instance I have shown the shaft 35 provided with a mitre gear 58 meshing with mitre gear 59 on operating shaft 60. This shaft 60 can be rotated in any manner as desired, but for example we have illustrated the shaft 60 as extending to be available beyond or outside of casing 4. As disclosed in Figures 2 and 17, an operating handle or crank 61 is fixed on the outer end of shaft 60, and this handle can be swung to rotate shaft 60, and through the mitre gearing to rotate valve 34 to any desired setting from full closed to full open position. If desired, an operating handle grip 62 can be provided for convenience in setting the valve, and a dial or indications can be provided as at 63 to show the valve setting.

The gear and transmission casing 6 and the parts 26 and 29 and 40, and also the valve 34 can be made as die castings which will fit quite accurately in place within the circular chamber 25, and these parts will be sufficiently liquid-tight with only slight if any necessity for finishing the faces thereof. When the mechanism is in operation, with the valve 34 completely closed, it is desirable that the pressure be relieved at each end of the oscillating stroke, and this is accomplished by making the bearing extension 43 of such peripheral extent only that it will fit with the bearing face 39 through the greater part of the swinging or oscillatory travel of oscillator 40. Then, when this oscillator 40 reaches the end of each swinging movement, the bearing extension 43 is adapted to move beyond and clear the bearing face 39 so that the oil or other fluid or liquid can have a period of free flow from one side of the oscillatory piston 40 to the other, to thus equalize the liquid pressure and prevent pumping or unequal utilization of the liquid on either side of the oscillator piston 40. Where the parts are operating under some settings of the valve, there may be some tendency to misalignment of the two oscillatory piston portions 26 and 40, and to prevent and compensate for any such tendency, I provide the driven oscillator piston 26 with pockets or openings 64 in the piston faces 45, and mount thereon coil springs 65, having their ends projecting sufficiently to contact the piston faces 44 of the driving oscillator 40, should there be tendency of the two oscillators to approach too closely and thus prevent accumulation of sufficient liquid for proper and efficient operation.

The rotation of drive gear 15 will cause oscillation of the piston 40, through the connection of pitman rod 56, to swing or oscillate this piston member back and forth, as illustrated through Figures 6 through 10 of the drawings, and the degree of oscillation of the piston 26 will of course be dependent upon the setting of the valve 34. Thus, the mechanism can be set with the valve closed to give positive oscillation through a considerable increased number of degrees of swing, and as the valve is opened the length or degree and the force of the oscillation will be decreased, until with the valve fully open the operation is stopped. With this mechanism, it is not necessary to have any clutch or other control parts, and the degree of oscillation and the force applied can be varied to be substantially at any point between the full operation and the full stop.

In the foregoing specification and in the drawings, I have described and have shown my invention as applied to and used with a washing machine, as this invention lends itself particularly to such use; but, there may be other manners in which this can be applied to operate a washing machine and other mechanisms.

While I have herein shown and described only certain specific embodiments of my invention and have set forth only certain possible modifications in the parts and the use, it will be appreciated that many changes and variations can be made in the form, construction and arrangement of the parts, and in the manner of connecting and operating the mechanism, without departing from the spirit and scope of my invention.

I claim:

1. Oscillating impelling transmission means for washing machines and the like comprising a substantially cylindrical transmission casing closed at its ends, a shaft journaled axially in said casing and having one end extending therefrom, a driven oscillator connected on said shaft within the casing, an impeller oscillator journaled on said shaft within the casing, said impeller oscillator and driven oscillator being positioned on opposite sides of the shaft, a valve member positioned in the cylindrical chamber between the closed ends thereof and provided with a liquid flow passage leading to opposite sides of the impeller oscillator, said cylindrical transmission casing being adapted to contain a substantially non-compressible liquid, pitman means to oscillate said impeller oscillator to circulate liquid through the passage, and an adjustable valve in said passage to regulate the flow of liquid therethrough.

2. A mechanism of the character described comprising a substantially cylindrical transmission casing closed at its ends, a shaft journaled axially in said casing and having one end extending therefrom, a sectorial driven oscillator fixedly connected with said shaft within the casing near one end, a sectorial impeller oscillator journaled on said shaft within the casing adjacent to the other end, said impeller oscillator and driven oscillator being positioned on opposite sides of the shaft, a valve member positioned within the cylindrical chamber between the closed ends thereof and having a portion around the shaft between the oscillators, said valve member being provided with a liquid flow passage leading to opposite sides of the impeller oscillator, said cylindrical transmission casing being adapted to contain a substantially non-compressible liquid, means to oscillate said impeller oscillator to circulate liquid through said passage, and an adjustable valve in said passage to regulate the quantity flow of liquid therethrough.

3. A variable oscillating transmission means comprising a substantially cylindrical transmission casing closed at its ends and provided at one end with a journal bearing, a shaft journaled in said bearing with one end thereof within the transmission casing and the other end extending therethrough, a sectorial driven oscillator piston in the transmission casing adjacent to one end and connected with said shaft, a sectorial impeller oscillator piston journaled on said shaft on the opposite side from the driven oscillator and at the opposite end of the transmission casing, said driven impeller oscillator having a piston face of proportionately larger area than the piston face of the driven oscillator, a valve member mounted in the cylindrical chamber between the closed ends thereof and provided with a liquid flow passage leading to opposite sides of the impeller oscillator, said cylindrical transmission casing being adapted to contain and be substantially filled with a substantially non-compressible liquid, means to oscillate said impeller oscillator to circulate liquid through the passage, and an adjustable valve in said passage to regulate the flow of liquid therethrough.

4. Oscillating impelling transmission means for washing machines and the like comprising a substantially cylindrical transmission casing closed at its ends and having an axially located journal bearing at one end, a shaft journaled in said bearing and having one end extending from the casing, a driven oscillator connected on said shaft within the casing, an impeller oscillator journaled on said shaft within the casing, said impeller oscillator and the driven oscillator being positioned on opposite sides of the shaft, a valve member positioned in the cylindrical chamber between the closed ends thereof and provided with a liquid flow passage leading to opposite sides of the impeller oscillator, said cylindrical transmission casing being adapted to contain a substantially non-compressible liquid, a valve controlling said passage, a constantly rotated part, and a pitman connection from said rotated part to the impeller oscillator whereby rocking movement is imparted thereto to cause circulation of liquid through the passage with the flow and circulation regulated by settings of the valve.

5. A variable oscillating transmission means comprising an upright substantially cylindrical transmission casing closed at its ends and having a bearing axially through the upper end, a shaft journaled in said bearing and having an end extending upwardly therefrom, a driven oscillator connected on said shaft in the lower part of the casing, an impeller oscillator journaled on said shaft near the upper end of the casing and on the opposite side of the shaft from said driven oscillator, a valve member positioned in the cylindrical chamber between the closed ends thereof and provided with a liquid flow passage leading to opposite sides of the impeller oscillator, said cylindrical transmission casing being adapted to contain a substantially non-compressible liquid and having an arcuate slot through the upper end around the axial center, a rotating part, and a pitman connection from said rotating part having the opposite end of the pitman connected through said slot with the impeller oscillator whereby rocking movement is imparted thereto.

6. Oscillating impelling transmission means for washing machines and the like comprising an upright substantially cylindrical transmission casing closed at its upper end, a shaft journaled in said bearing and having its upper end extending from the casing, a driven oscillator in the lower part of the casing connected with said shaft, an impeller oscillator in the upper part of the casing journaled on said shaft and disposed on the opposite side of the shaft from said driven oscillator, a valve member positioned in the cylindrical chamber between the closed ends thereof and having a portion around said shaft provided with a curved seat, said impeller having a bearing portion fitting in liquid tight bearing with said curved seat and the seat being of such length that as the impeller oscillator is oscillated to extremes of movement the bearing surface is clear, said valve casing having a liquid flow passage therethrough, a valve in said passage, and means to oscillate said impeller oscillator.

ALLEN J. PATCH.

REFERENCES CITED

The following references are of record in the file of this patent:

UNITED STATES PATENTS

| Number | Name | Date |
| --- | --- | --- |
| 2,046,901 | Kirby | July 7, 1936 |
| 2,091,402 | Waterworth | Aug. 31, 1937 |
| 2,444,018 | Deloghia | June 22, 1948 |
| 2,479,535 | Deloghia | Aug. 16, 1949 |